United States Patent
Hoyte et al.

(10) Patent No.: US 6,873,149 B1
(45) Date of Patent: Mar. 29, 2005

(54) METHOD AND SYSTEM FOR EDDY CURRENT PROXIMITY SYSTEM NOISE REDUCTION

(75) Inventors: Scott Mordin Hoyte, Carson City, NV (US); Sherrie Ann Clark, Minden, NV (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/723,196

(22) Filed: Nov. 26, 2003

(51) Int. Cl.[7] .............................................. G01B 7/14
(52) U.S. Cl. .......................... 324/207.16; 324/207.26
(58) Field of Search ..................... 324/207.11, 207.13, 324/207.15, 207.16–207.18, 207.23, 207.24, 207.25, 207.26; 702/155, 158

(56) References Cited

U.S. PATENT DOCUMENTS

| | | | |
|---|---|---|---|
| 4,303,885 A | 12/1981 | Davis et al. | |
| 4,322,683 A | 3/1982 | Vieira et al. | |
| 4,467,281 A | 8/1984 | Davis et al. | |
| 4,652,822 A | 3/1987 | Wallace | |
| 4,853,634 A | 8/1989 | Tornblom | |
| 4,922,201 A | 5/1990 | Vernon et al. | |
| 4,924,182 A | 5/1990 | Vernon et al. | |
| 5,182,513 A | 1/1993 | Young et al. | |
| 6,346,807 B1 * | 2/2002 | Slates | 324/207.16 |
| 2002/0153880 A1 | 10/2002 | Slates | |

* cited by examiner

Primary Examiner—Bot LeDynh
(74) Attorney, Agent, or Firm—William Scott Andes; Armstrong Teasdale LLP

(57) ABSTRACT

A method of determining a gap between an eddy current proximity transducer and a target is provided. The method includes providing a data structure that is populated with data that is relative to a gap value corresponding to a complex impedance value of the transducer, exciting the transducer at a plurality of different frequencies, determining a complex impedance value of the transducer at a respective one of the plurality of frequencies, and determining the gap using the data structure and the complex impedance value.

19 Claims, 3 Drawing Sheets

METHOD AND SYSTEM FOR EDDY CURRENT PROXIMITY SYSTEM NOISE REDUCTION

BACKGROUND OF THE INVENTION

The present invention relates generally to an eddy current proximity system and, in particular, to methods and systems used to facilitate reducing circuit noise in a digital eddy current proximity system.

At least some known eddy current proximity systems may experience signal noise that affects an output from an eddy current transducer coupled to the system. For example, an analog eddy current proximity system may experience relatively consistent noise of approximately ten millivolts (mv) peak-to-peak over a span from approximately ten mils to approximately ninety mils of gap between the transducer and a target. In contrast, within at least one known digital eddy current proximity system, the noise is of relatively low amplitude, for example, approximately seven mv peak-to-peak at ten mils gap, but increases to approximately fifty mv peak-to-peak at ninety mils gap.

Accordingly, at least some known digital eddy current proximity systems use a table lookup and interpolation to determine gap. When using a single frequency, the digital eddy current proximity system uses only the table that corresponds to the specific frequency that is used to excite the transducer, which is also the frequency used to build the table. However, limiting the digital eddy current proximity system to only one frequency and only one look-up table may limit an accuracy of the digital eddy current proximity system.

BRIEF DESCRIPTION OF THE INVENTION

In one aspect, a method of determining a gap between an eddy current proximity transducer and a target is provided. The method includes providing a data structure that is populated with data that is relative to a gap value corresponding to a complex impedance value of the transducer, exciting the transducer at a plurality of different frequencies, determining a complex impedance value of the transducer at a respective one of the plurality of frequencies, and determining the gap using the data structure and the complex impedance value.

In another aspect, a system for determining a gap between an eddy current proximity transducer and a target is provided. The system includes a network that includes the transducer serially coupled to an electrical component, a signal generator circuit operatively coupled to the network wherein the signal generator circuit is configured to drive a current that includes a plurality of frequency components through the network and wherein a first analog voltage is impressed across the network and a second analog voltage is impressed across the transducer. The system also includes a sampling and digitizing circuit coupled to the signal generator circuit wherein the sampling and digitizing circuit is configured to convert the first analog multi-frequency voltage impressed across the network and the second analog multi-frequency voltage impressed across the transducer into a plurality of digitized voltages, a convolution circuit that includes an input terminal corresponding to at least one of the plurality of component frequencies wherein the convolution circuit is configured to convolve each digitized voltage with a digital waveform for forming a first complex number and a second complex number correlative to the first analog voltage and the second analog voltage, respectively for at least one of the component frequencies, and a memory including a data structure corresponding to at least one of the component frequencies wherein the data structure is populated with data that is relative to gap values based on at least one of the first complex number and the second complex number.

DETAILED DESCRIPTION OF THE INVENTION

Figure 1:
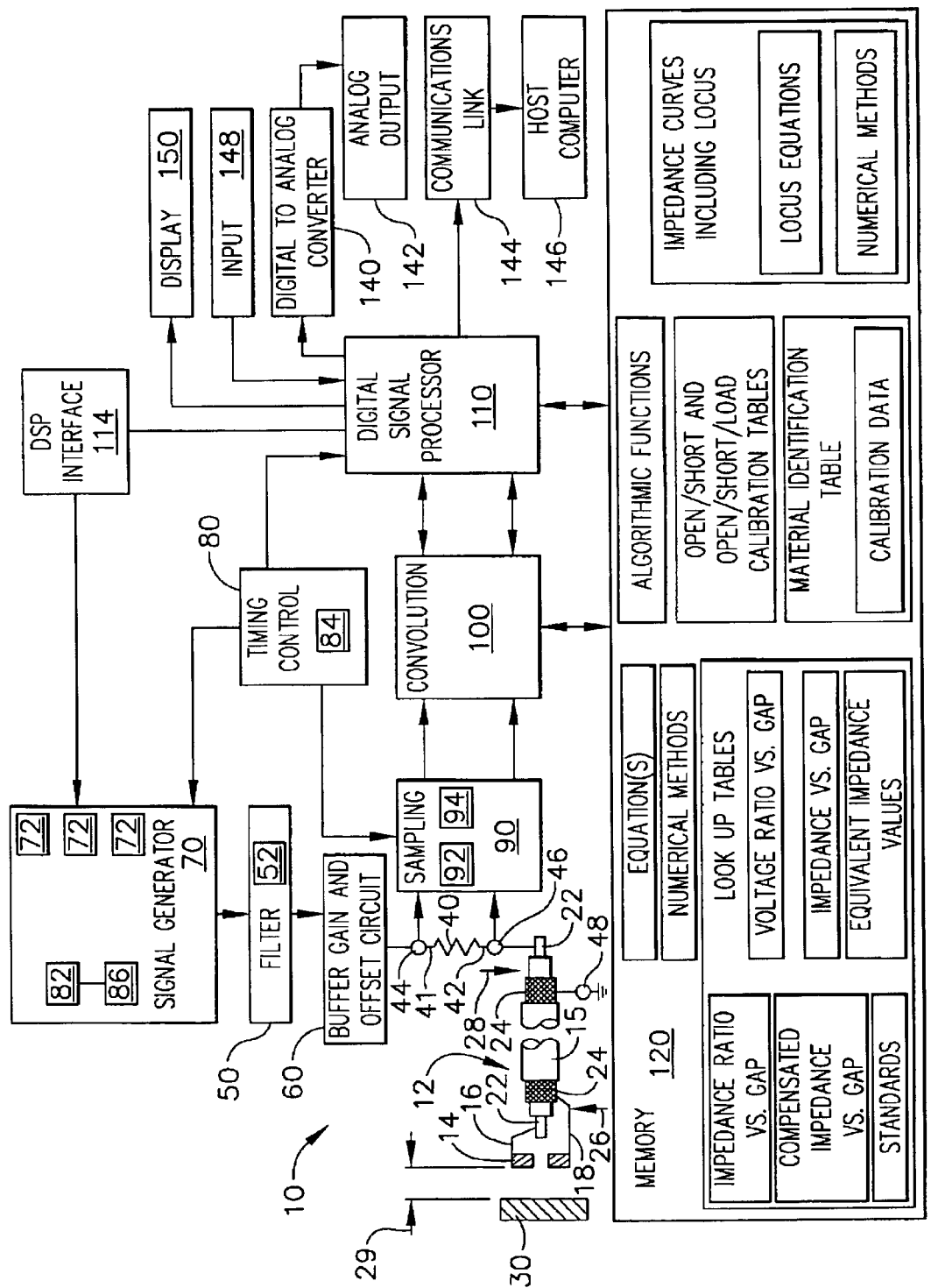
FIG. 1 is a schematic block diagram of an exemplary digital eddy current system.

FIG. 1 is a schematic block diagram of an exemplary digital eddy current system 10 that includes a transducer 12 operatively coupled to system 10. System 10 includes a voltage ratio method (VR method) used for digitally measuring an unknown electrical impedance of transducer 12. Transducer 12 includes an integral sensing element or coil 14 and a multi-conductor transducer cable 15. Sensing element 14 includes a first electrical lead 16 and a second electrical lead 18. Transducer cable 15 includes a first conductor 22 and a second conductor 24 extending from a first end 26 to a second end 28 of transducer cable 15.

At cable first end 26, first conductor 22 and second conductor 24 are each operatively coupled to the first electrical lead 16 and second electrical lead 18 of sensing element 14, respectively. At cable second end 28, first conductor 22 is coupled to second terminal 42 of resistor 40 at node 46 and second conductor 24 is coupled to ground node 48, thereby grounding one lead of the unknown dynamic transducer impedance $Z_{unknown}$.

In the exemplary embodiment, transducer 12 is coupled to a machine for sensing raw dynamic data that may be correlated to a gap distance 29 defined between transducer 12 and a conductive or metallic target 30, such as, but, not limited to a rotating shaft of the machine or an outer race of a rolling element bearing being monitored. The electrical impedance measured at the conditioning circuitry is the electrical combination of target 30, transducer 12 including sensing coil 14 and cable 15, an extension cable, if there is one, (not shown) and the circuitry of system 10. This impedance is usually called the "tank impedance" or parallel impedance ($Z_p$).

Digital eddy current system 10 includes a resistor 40 having a resistance value R, and a first terminal 41 and a second terminal 42 that are respectively coupled between a first node 44 and a second node 46.

Transducer 12 has an unknown dynamic transducer impedance having a value $Z_{unknown}$ and is coupled between second terminal 42 of resistor 40 at node 46 and a ground node 48. Accordingly, resistor 40 and transducer 12 form a serial electrical connection.

Digital eddy current system 10 also includes a filter 50, a signal generator 70, a timing control circuit 80, a sampling circuit 90, a convolution circuit 100 and a digital signal processor (DSP) 110. Signal generator 70 is operatively coupled to resistor first terminal 41 at node 44 through filter 50 for driving a signal through resistor 40, and transducer 12 thereby impressing a first voltage $V_1$ across serially connected resistor 40 and transducer 12, and a second voltage $V_2$ only across transducer 12. As used herein, the term "processor" also refers to microprocessors, central processing units (CPU), application specific integrated circuits (ASIC), logic circuits, and any other circuit or processor capable of executing inspection system, as described herein.

In the exemplary embodiment, signal generator 70 is operatively coupled to resistor 40 at node 44 via filter 50 and to digital signal processor (DSP) 110 for driving a programmable dynamic signal of one or more frequencies through filter 50 and the serial connection of the resistor 40/transducer 12 combination. Specifically, signal generator 70 includes a current source, such as, a direct digital synthesis (DDS) device 72 that is operatively coupled to resistor first terminal 41 via filter 50 and buffer, gain and offset circuit 60 for driving the dynamic signal or waveform through resistor 40 and transducer 12.

This dynamic signal causes the first voltage $V_1$ to be impressed across the serial connection of resistor 40 and transducer 12 and causes the second voltage $V_2$ to be impressed only across transducer 12. In the exemplary embodiment, transducer sensing element 14 is coupled proximate target 30 such that this dynamic signal causes sensing element 14 to generate an alternating magnetic field that induces eddy currents in the metallic target 30. In turn, the eddy currents in target 30 induce a voltage in sensing element 14 and hence, a change in an impedance of transducer 12 which varies as a function of, for example, variations of gap distance 29 between transducer 12 and target 30.

In the exemplary embodiment, signal generator 70 includes a plurality of DDS devices 72 coupled to resistor first terminal 41 via filter 50 and buffer, gain and offset circuit 60 for driving a plurality of dynamic signals at different frequencies through resistor 40 and transducer 12, and subsequently performing processing including convolution for obtaining simultaneous impedance measurements of transducer 12 at different frequencies which may be correlated to gap distance 29 between transducer 12 and target 30. Simultaneous impedance measurements facilitates determining gap 29 in real-time. As used herein, real-time refers to outcomes occurring at a substantially short period after a change in the inputs affecting the outcome. The period is the amount of time between each iteration of a regularly repeated task. Such repeated tasks are called periodic tasks. The time period is a design parameter of the real-time system that may be selected based on the importance of the outcome and/or the capability of the system implementing processing of the inputs to generate the outcome.

Each DDS device 72 may be coupled to DSP 110 via interface 114 and generates a pure frequency/phase-programmable dynamic signal such as a sinusoidal wave. DSP 110 may include an algorithm to program both the frequency and the phase of the output signals which in turn may be used to drive transducer 12 with a frequency/phase-programmable dynamic analog signal having an output frequency/phase which may be precisely manipulated under full digital control. Therefore, each DDS device 72 may be digitally programmed to output sine waves at a plurality of frequencies/phases with precision for use as driving signals or reference signals. In one embodiment, DDS device 72 is a device such as part number AD9850 commercially available from Analog Devices, Norwood, Mass.

Filter 50 is electrically coupled between DDS device 72 and resistor 40 for filtering the analog dynamic signals output from DDS device 72. In the exemplary embodiment, filter 50 includes at least one low pass filter 52 electrically coupled between each DDS device 72 and first terminal 41 of resistor 40 to purify the output dynamic signals or waveforms of each DDS device 72 for eliminating, for example, harmonics created in DDS device 72. For example, as a result of the outputs of DDS devices 72 being ten plus bit digital to analog converters, the quantitization noise is filtered out using a low pass filter. Therefore, filters 52 remove the steps and facilitate smoothing out the analog dynamic signal outputs from DDS devices 72. Additionally, filters 52 facilitates reducing the noise bandwidth of the system 10 to improve a signal to noise ratio. In one embodiment, low pass filters 52 are five pole elliptical filter devices.

In the exemplary embodiment, buffer, gain and offset circuit 60 is electrically coupled between filter 50 and resistor 40 for buffering and amplifying the analog dynamic signals and providing any desired offset of the analog dynamic signals. Sampling circuit 90 is coupled to first node 44 for sampling and digitizing voltage $V_1$ impressed across the serially connected resistor 40/transducer 12 combination. Additionally, sampling circuit 90 is coupled to second node 46 for sampling and digitizing voltage $V_2$ that is impressed only across transducer 12. In the exemplary embodiment, sampling circuit 90 includes a pair of analog-to-digital converters (ADC) 92 and 94 coupled to first node 44 and second node 46 respectively for sampling and digitizing the first dynamic voltage $V_1$ and the second dynamic voltage $V_2$. In one embodiment, ADCs 92 and 94 are fourteen bit, wide bandwidth converters such as part number AD6644 commercially available from Analog Devices, Norwood, Mass.

Timing control circuit 80 provides synchronization between the output signal of signal generator 70 and the sampling rate of sampling circuit 90 such that the phase relationship between the output signal and samples is maintained. Timing control circuit 80 is operatively coupled to each DDS device 72, of ADCs 92 and 94, and to DSP 110. Therefore, DDS devices 72 are clocked by timing control circuit 80 such that the frequency of the output of DDS devices 72 is accurately set. Additionally, timing control circuit 80 provides synchronization between the output of DDS devices 72 and the sampling rate of ADCs 92 and 94 such that a phase relationship between the dynamic driving signal(s) and the sampled signals is maintained. Accordingly, sampling may be performed in synchrony with the dynamic driving signals.

Timing control circuit 80 includes a quartz clock oscillator 84 that is operatively coupled to each DDS device 72 for providing a clock signal to each DDS device 72.

DDS device 72 and ADCs 92 and 94 are also clocked by oscillator 84 to ensure a consistant phase between signal generator 70 and sampling circuit 90. In the exemplary embodiment, DDS devices 72 each generate a discreet frequency which are then summed together before being transmitted to transducer 12. In the exemplary embodiment, the frequencies are 100 kHz, 500 kHz, and 1.102 MHz. In other embodiments, other frequencies may be used and more or less than three frequencies may be used.

Convolution circuit 100 may be a stand-alone device in the form of, for example, a digital down counter (DDC). In the exemplary embodiment, convolution circuit 100 is coupled between sampling circuit 90 and DSP 110 to do the convolution operation. Analog-to-digital converted voltages $V_{1D}$ and $V_{2D}$ are received and convolved by convolution circuit 100 and then transmitted to DSP 110 as complex voltage numbers $V_{1C}$ and $V_{2C}$. Convolution circuit 100 may be programmed to process a predetermined frequency. In one embodiment, convolution circuit 100 is a digital down counter (DDC) such as part number HSP 50216, commercially available from Intersil Corporation, Milpitas, Calif.

In an alternative embodiment, digital convolution circuit 100 is integrally formed with digital signal processor 110 wherein DSP 110 is operatively coupled to ADCs 92 and 94 for receiving the first and second digitized voltage signals $V_{1D}$ and $V_{2D}$ from ADCs 92 and 94 and convolving the digitized voltages into respective complex voltage numbers $V_{1C}$ and $V_{2C}$ via integral convolution circuit 100. A DSP 110 having an integral convolution circuit 100 such as the 210XX series of devices is commercially available from Analog Devices, Norwood, Mass. The process of convolving the digitized voltages into respective complex voltage numbers $V_{1C}$ and $V_{2C}$ via convolution circuit 100 is defined as in-phase and quadrature detection or quadrature synthesis. The calculated impedance may be converted by the processor 110 into a voltage or gap value correlative to the gap distance 29 between transducer 12 and target 30 being monitored by using equation(s), algorithms, numerical methods or lookup tables stored in, for example, a memory 120 coupled to processor 110. The impedance or gap values may be outputted via a digital-to-analog converter 140 to an analog output 142. Analog output 142 may include, for example, alarms, relays, and circuit breakers that may be set to trip when the analog output is outside a predetermined nominal operating range.

The impedance or gap values may be outputted through a communications link 144 to a host computer 146 for further processing for the use of monitoring rotating or reciprocating machinery. An input 148, such as, but not limited to a keyboard, a pointing device, a voice command circuit and/or touch screen may be used to input data or modify settings of system 10 through a menu driven interface which may be viewed on a display 150. The input data may be used immediately in calculations or may be stored in memory 120 for later use. Display 150 may include, for example, a CRT or LCD monitor, and/or hardcopy device.

In operation, a radio frequency (RF) signal is transmitted from transducer coil 14 such that a RF field is created around the transducer tip. In the exemplary embodiment, the RF field extends to a gap distance 29 greater than approximately 0.1 inches (100 mils). When target 30 is present in the RF field, eddy currents flow in the surface of target 30. A penetration depth of the eddy currents depends on a conductivity and permeability of target 30. For example, the penetration depth of E4140 steel is approximately 0.003 inches (3 mils). When transducer 12 is close enough to target 30 to cause eddy currents to flow in target 30, the RF signal is affected, in that, the RF signal amplitude is at a minimum when gap distance 29 between transducer 12 and target 30 is at a minimum, resulting in a maximum of eddy current flow in target 30. Similarly, the RF signal amplitude is at a maximum when gap distance 29 between transducer 12 and target 30 is at a maximum, resulting in a minimum of eddy current in target 30. Additionally, when target 30 is moving slowly within the RF field, the RF signal amplitude increases or decreases slowly. If the target is moving rapidly within the RF field, the RF signal amplitude increases or decreases rapidly. Oscillatory movement of target 30 causes the RF signal to modulate, such as when target 30 is vibrating in relation to transducer 12.

Figure 2:
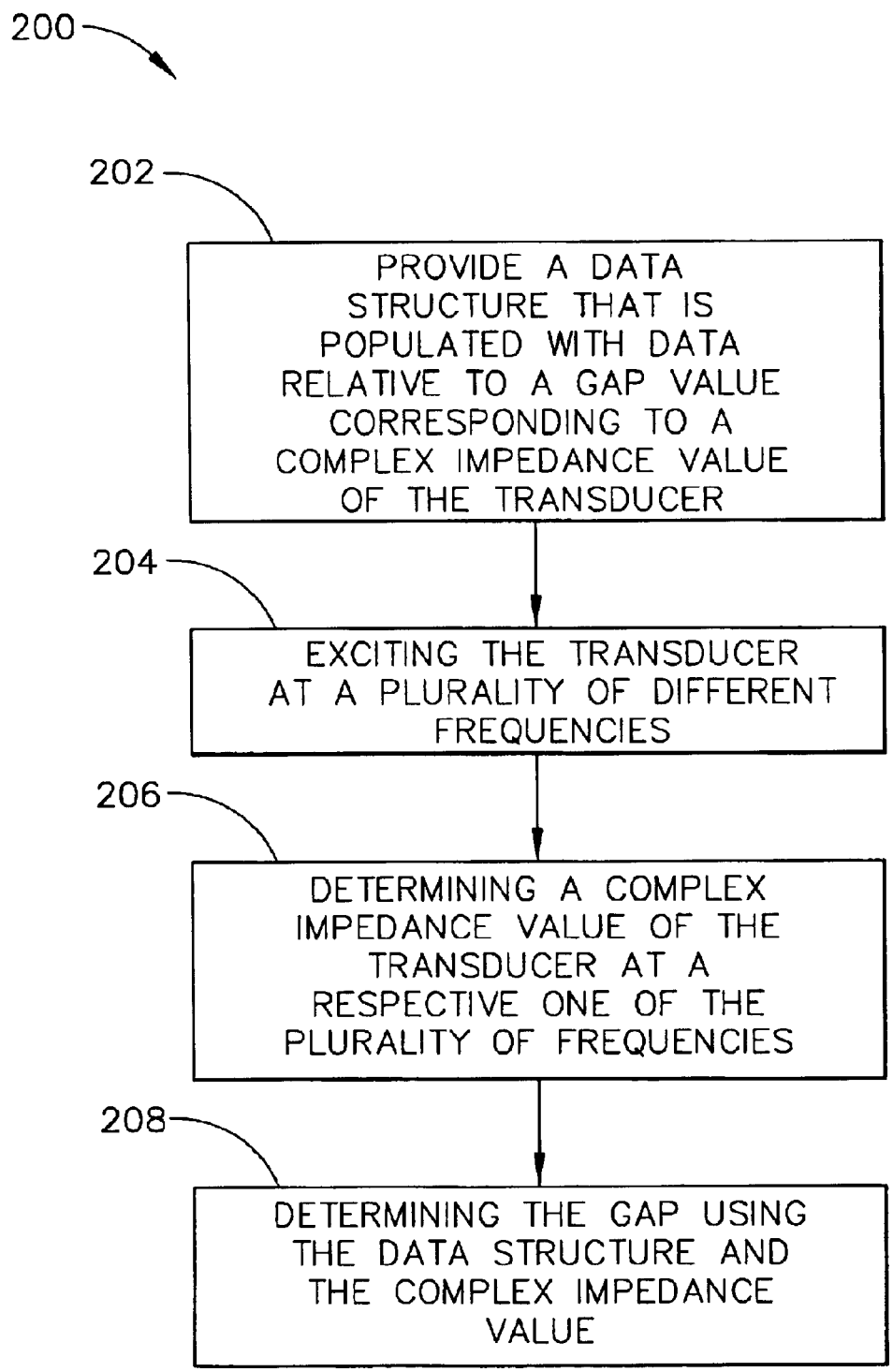
FIG. 2 is a block diagram of an exemplary method of determining a gap between an eddy current proximity transducer and a target that may be used with the system shown in FIG. 1.

FIG. 2 is a block diagram of an exemplary method 200 of determining a gap between an eddy current proximity transducer and a target that may be used with system 10 (shown in FIG. 1). The method includes providing 202 a data structure that is populated with data that is relative to a gap value corresponding to a complex impedance value of the transducer. In the exemplary embodiment, a database that includes a look-up table for each respective frequency used to excite transducer 12 is provided in memory 20 of system 10. The number of different frequencies that may be used to excite transducer 12 is selectable by the user. In other embodiments, memory 120 may include a different number of look-up tables than there are selectable frequencies in system 10. In the exemplary embodiment, system 10 includes three DDS 72, each providing a discreet frequency component to transducer 12, and memory 120 includes three respective look-up tables. Transducer 12 is excited 204 at each of the three different frequencies. The frequencies are summed to provide a composite signal to transducer 12. The interaction of transducer 12 with target 30 generates signals that are sampled and transmitted to DDCs 100. In the exemplary embodiment, system 10 includes two DDCs 100, one is associated with V1, and the other is associated with V2. Each DDC 100 has four channels, of which only three are used, because of the three distinct signals exciting transducer 12. The channels of DDCs 100 are programmed to receive the same frequencies that are generated by the DDSs 72. A complex impedance value of the transducer at each of the three frequencies is determined 206. The gap corresponding to each complex impedance value is determined 208 using the data structure stored in memory 120. The data structure may include one or more look-up tables and/or transfer functions that include data relating complex impedance values to gap values at a respective frequency. A particular look-up tables and/or transfer function may be selected for different procedures or when imaging different targets. The data structure data may be interpolated to facilitate increasing the accuracy of the gap determination 208. Additionally, the interpolations may be averaged to facilitate reducing the effects of noise on the final gap determination 208.

Figure 3:
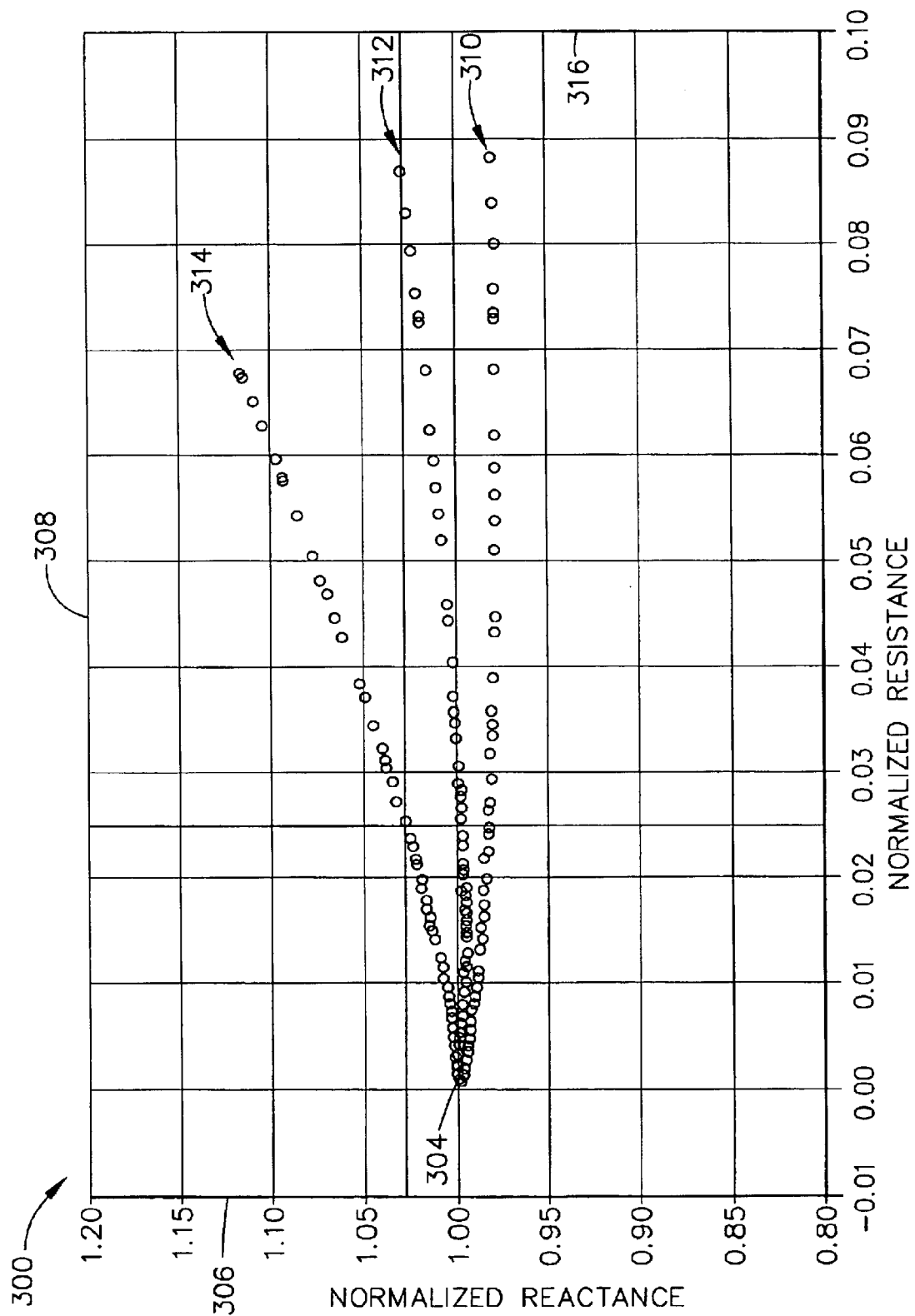
FIG. 3 is a graph of exemplary normalized impedance traces that may be acquired using the method shown in FIG. 2.

FIG. 3 is a graph 300 of exemplary normalized impedance traces that may be acquired using method 200 (shown in FIG. 2). Graph 300 includes an x-axis 302 that illustrates increasing normalized resistance of transducer 12 from a graph origin 304. An y-axis 306 illustrates increasing normalized impedance of transducer 12 from origin 304 to y-axis extremis 308. A plurality of normalized impedance traces illustrates the impedance of transducer 12 in response to excitation at three different frequencies. A trace 310 illustrates the normalized impedance at 100 kHz, a trace 312 illustrates the normalized impedance at 500 kHz, and a trace 314 illustrates the normalized impedance at 1.102 MHz. The normalized impedance of transducer 12 at far gap is illustrated at origin 304 and the normalized impedance of transducer 12 at near gap is illustrated at x-axis right extremis 316. Each data point on graph 300 corresponds to an impedance of transducer 12 at a particular gap and a respective excitation frequency. Each trace 310, 312, and 314 has a corresponding data structure located in memory 120 that permits an interpolation of data points to determine a corresponding gap. In the exemplary embodiment, the data structure is a look-up table. The three gaps that are determined from the look-up table may be averaged to reduce the effects of noise that may be present in system 10, cable 15, and/or transducer 12. The gap determined by noise reduction method 200 may be output textually and/or graphically via display 150. The determined gap may be output electronically via output 142 and/or link 144.

The above-described methods and system provide a cost-effective and reliable means for reducing noise in a process instrumentation system, for example, a digital eddy current proximity system. More specifically, the methods and system facilitate utilizing look-up tables and digital processing to facilitate reducing noise effects in the system. Therefore, the methods and system described herein facilitate monitoring equipment in a cost-effective and reliable manner.

While the present invention is described with reference to facilitating reducing noise in a digital eddy current proximity system, numerous other applications are contemplated. For example, it is contemplated that the present invention may be applied to any system wherein noise may influence other instrumentation systems, such as, but not limited to, electrical distribution systems, process measurement systems and instrumentation systems.

Exemplary embodiments of digital eddy current proximity systems are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method of determining a gap between an eddy current proximity transducer and a target, said method comprising:
   providing a data structure that is populated with data that is relative to a plurality of gap values corresponding to a plurality of complex impedance values of the transducer;
   exciting the transducer at a plurality of different frequencies;
   determining a plurality of complex impedance values of the transducer at each of the plurality of frequencies;
   determining a plurality of gap values using the data structure and the plurality of complex impedance values; and
   determining the gap using the plurality of gap values.

2. A method in accordance with claim 1 wherein the data structure includes a look-up table that is populated with data that is relative to at least two of the plurality of excitation frequencies, said method further comprises determining a plurality of gap values based on interpolating data in the look-up table.

3. A method in accordance with claim 1 wherein the data structure includes a look-up table that is populated with data that is relative to each of the plurality of excitation frequencies, said method further comprises determining a plurality of gap values based on interpolating data for each respective frequency.

4. A method in accordance with claim 3 wherein determining the gap comprises averaging the plurality of gap values.

5. A method in accordance with claim 1 wherein exciting the transducer at a plurality of different frequencies comprises exciting the transducer at a plurality of different frequencies substantially simultaneously.

6. A method in accordance with claim 1 wherein exciting the transducer at a plurality of different frequencies comprises exciting the transducer at three different frequencies substantially simultaneously.

7. A method in accordance with claim 6 wherein determining a complex impedance value of the transducer comprises determining a respective complex impedance value of the transducer at each of the three frequencies substantially simultaneously.

8. A method in accordance with claim 1 wherein determining the gap using the data structure and the complex impedance value comprises determining the gap in real-time using the data structure and the complex impedance value.

9. A method in accordance with claim 1 wherein the data structure includes three look-up tables that each include data relative to one of the plurality of excitation frequencies, and wherein determining the gap using the data structure and the complex impedance value comprises determining a gap value at each excitation by interpolating data in each respective look-up table corresponding to each complex impedance value.

10. A method in accordance with claim 9 wherein determining the gap comprises averaging the gap values.

11. A system for determining a gap between an eddy current proximity transducer and a target, said system comprising:
    a network comprising said transducer serially coupled to an electrical component;
    a signal generator circuit operatively coupled to said network, said signal generator circuit configured to drive a current that includes three selectable and programmable direct digital synthesis devices each device configured to generate a plurality of frequencies through said network wherein a first analog voltage is impressed across said network and a second analog voltage is impressed across said transducer;
    a sampling and digitizing circuit coupled to said signal generator circuit, said sampling and digitizing circuit configured to convert the first analog multi-frequency voltage impressed across said network and said second analog multi-frequency voltage impressed across said transducer into a plurality of digitized voltages;
    a convolution circuit comprising an input terminal corresponding to at least one of the plurality of frequencies, said convolution circuit configured to convolve each digitized voltage with a digital waveform for forming a first complex number and a second complex number correlative to the first analog voltage and the second analog voltage respectively for at least one of the frequencies; and
    a memory comprising a data structure corresponding to each of the frequencies, said data structure populated with data that is relative to a plurality of gap values based on at least one of the first complex number and the second complex number.

12. A system in accordance with claim 11 wherein said transducer includes a serially coupled cable and wherein said second analog voltage is impressed across a serial combination of said transducer and said cable.

13. A system in accordance with claim 11 wherein said signal generator circuit includes a current source configured to generate a multi-frequency current.

14. A system in accordance with claim 11 wherein said convolution circuit comprises a digital circuit configured to receive at least one frequency on an input channel that is selectively tuned to the respective frequency.

15. A system in accordance with claim 11 wherein said convolution circuit comprises a programmable digital circuit configured to receive each frequency on a separate respective input channel that is selectively tuned to the respective frequency.

16. A system in accordance with claim 11 wherein said convolution circuit comprises a digital down counter configured to receive at least one frequency on a separate respective input channel that is selectively tuned to the respective frequency.

17. A system in accordance with claim 11 wherein said memory comprises a look-up table corresponding to each of the frequencies, said look-up table populated with data that is relative to gap values based on at least one of the first complex number and the second complex number.

18. A system in accordance with claim 11 further comprising a processor configured to correlate the first complex number and the second complex number for at least one of the frequencies to respective gap data in said data structure.

19. A system in accordance with claim 18 wherein said processor is configured to correlate the first complex number and the second complex number for at least one of the frequencies to respective gap data in said data structure by interpolation.

* * * * *